(12) United States Patent
Nabeto et al.

(10) Patent No.: US 12,288,187 B2
(45) Date of Patent: Apr. 29, 2025

(54) PRODUCT DETECTION APPARATUS, PRODUCT DETECTION METHOD, AND NON-TRANSITORY STORAGE MEDIUM

(71) Applicant: NEC Corporation, Tokyo (JP)

(72) Inventors: Yu Nabeto, Tokyo (JP); Katsumi Kikuchi, Tokyo (JP); Takami Sato, Tokyo (JP); Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 246 days.

(21) Appl. No.: 17/908,392

(22) PCT Filed: Mar. 9, 2020

(86) PCT No.: PCT/JP2020/009985
§ 371 (c)(1),
(2) Date: Aug. 31, 2022

(87) PCT Pub. No.: WO2021/181452
PCT Pub. Date: Sep. 16, 2021

(65) Prior Publication Data
US 2023/0087980 A1 Mar. 23, 2023

(51) Int. Cl.
*G06Q 10/087* (2023.01)
(52) U.S. Cl.
CPC .................. *G06Q 10/087* (2013.01)
(58) Field of Classification Search
None
See application file for complete search history.

(56) References Cited

U.S. PATENT DOCUMENTS

| 9,996,818 | B1 * | 6/2018 | Ren | G06F 16/5866 |
| 11,042,836 | B1 * | 6/2021 | Goldstein | G06Q 10/087 |
| 11,250,456 | B2 * | 2/2022 | Schumacher | H02S 40/38 |

(Continued)

FOREIGN PATENT DOCUMENTS

| JP | 2015-088166 A | 5/2015 |
| JP | 2015-176227 A | 10/2015 |

(Continued)

OTHER PUBLICATIONS

International Search Report for PCT Application No. PCT/JP2020/009985, mailed on Sep. 8, 2020.

*Primary Examiner* — Kiersten V Summers

(57) ABSTRACT

A product detection apparatus (10) includes an acquisition unit (110), an image processing unit (120), and an output unit (130). The acquisition unit (110) acquires a plurality of images (one example of a first image) generated by an image capture unit (20) in association with a date and a time when the image is generated. These plurality of images are generated at different timings from each other. The image processing unit (120) detects a state (hereinafter, described as a first state) in which a new product is present on a product shelf (40) continuously for a reference time or longer by processing the plurality of images. The output unit (130) performs a first output when the first state is detected. The first output indicates that a product (50) has been returned to the product shelf (40) after the product (50) is taken out of the product shelf (40) by a customer.

15 Claims, 8 Drawing Sheets

(56) References Cited

U.S. PATENT DOCUMENTS

| | | |
|---|---|---|
| 2009/0204512 A1* | 8/2009 | Connell, II .......... G06Q 10/087 |
| | | 705/28 |
| 2014/0316951 A1* | 10/2014 | Rimnac .................. G06F 16/58 |
| | | 705/28 |
| 2015/0088641 A1 | 3/2015 | Aoki et al. |
| 2015/0092061 A1* | 4/2015 | Chao ...................... G06Q 10/06 |
| | | 348/158 |
| 2015/0149298 A1* | 5/2015 | Tapley ............... G06Q 30/0633 |
| | | 705/14.66 |
| 2015/0262460 A1 | 9/2015 | Ito |
| 2015/0339860 A1 | 11/2015 | Endo et al. |
| 2016/0132821 A1* | 5/2016 | Glasgow .............. G06Q 10/087 |
| | | 705/28 |
| 2017/0147966 A1* | 5/2017 | Aversa ................. G06Q 10/087 |
| 2018/0005176 A1* | 1/2018 | Williams ............. G06Q 10/087 |
| 2018/0020145 A1* | 1/2018 | Kotfis .................... H04N 23/72 |
| 2018/0285902 A1* | 10/2018 | Nazarian ............ G06Q 30/0202 |
| 2018/0322448 A1* | 11/2018 | Nemati ................ G06Q 10/087 |
| 2019/0080277 A1* | 3/2019 | Trivelpiece ............ G06N 20/00 |
| 2019/0104866 A1 | 4/2019 | Kobayashi et al. |
| 2019/0156277 A1* | 5/2019 | Fisher ...................... G06N 3/08 |
| 2020/0074402 A1* | 3/2020 | Adato .................... G06V 20/52 |
| 2021/0097478 A1* | 4/2021 | Yang ...................... G06V 20/20 |
| 2021/0166037 A1 | 8/2021 | Higa |

FOREIGN PATENT DOCUMENTS

| | | |
|---|---|---|
| JP | 2016-071471 A | 5/2016 |
| JP | 2019-109916 A | 7/2019 |
| JP | 2019-211891 A | 12/2019 |
| WO | 2019/111501 A1 | 6/2019 |

\* cited by examiner

| IMAGE CAPTURE UNIT IDENTIFICATION INFORMATION | ····· | | |
|---|---|---|---|
| PRODUCT NAME (PRODUCT CODE) | POSITION | NUMBER OF TIMES OF DETECTION | LOCATED |
| ··· | ··· | 1 | false |
| ··· | ··· | 5 | true |

PRODUCT DETECTION APPARATUS, PRODUCT DETECTION METHOD, AND NON-TRANSITORY STORAGE MEDIUM

This application is a National Stage Entry of PCT/JP2020/009985 filed on Mar. 9, 2020, the contents of all of which are incorporated herein by reference, in their entirety.

TECHNICAL FIELD

The present invention relates to a product detection apparatus, a product detection method, and a program.

BACKGROUND ART

One of behaviors of a customer at a store is returning a picked-up product to a product shelf. As literatures whose purpose is to detect the behavior, for example, Patent Documents 1 and 2 are known.

Patent Document 1 describes that a position of a hand of a customer and a position of a product are determined by processing an image, and the number of times the customer moves his/her hand to reach the product is accumulated for each product by using these positions. Patent Document 1 also describes that a period from a time when a customer picks up a product until a time when the customer returns the product is displayed on a display unit.

Patent Document 2 describes that a display status of a product is analyzed while estimating a pose of a customer by processing an image to thereby determine that a behavior of returning the product to a display location has occurred.

RELATED DOCUMENT

Patent Document

Patent Document 1: Japanese Patent Application Publication No. 2019-109916
Patent Document 2: Japanese Patent Application Publication No. 2019-211891

SUMMARY OF THE INVENTION

Technical Problem

In the above-described two patent literatures, it is necessary to detect a customer by image processing to detect that the customer has returned a product to a product placement area. One of objects of the present invention is to enable detecting that a customer has returned a product to a product placement area without detecting the customer.

Solution to Problem

The present invention provides a product detection apparatus including:
an acquisition unit for acquiring a plurality of first images generated at different timings from each other by a first imaging unit for photographing a product placement area;
an image processing unit for detecting a first state being a state in which a new product is present in the product placement area continuously for a reference time or longer by processing the plurality of first images; and
an output unit for performing a first output in a case where the first state is detected.

The present invention provides a product detection method including:
by a computer,
acquiring a plurality of first images generated at different timings from each other by a first imaging unit for photographing a product placement area;
detecting a first state being a state in which a new product is present in the product placement area continuously for a reference time or longer by processing the plurality of first images; and
performing a first output in a case where the first state is detected.

The present invention provides a program causing a computer to execute:
a function of acquiring a plurality of first images generated at different timings from each other by a first imaging unit for photographing a product placement area;
a function of detecting a first state being a state in which a new product is present in the product placement area continuously for a reference time or longer by processing the plurality of first images; and a function of performing a first output in a case where the first state is detected.

Advantageous Effects of Invention

According to the present invention, it is possible to detect that a customer has returned a product to a product placement area without detecting the customer.

BRIEF DESCRIPTION OF THE DRAWINGS

The above-described object, the other objects, features, and advantages will become more apparent from suitable example embodiments described below and the following accompanying drawings.

FIG. 3 is a diagram illustrating one example of information stored in a detection result storage unit.

DESCRIPTION OF EMBODIMENTS

Hereinafter, example embodiments according to the present invention are described with reference to the drawings. Note that, in all drawings, a similar constituent element is designated by a similar reference sign, and description thereof is omitted as necessary.

First Example Embodiment

Figure 1:
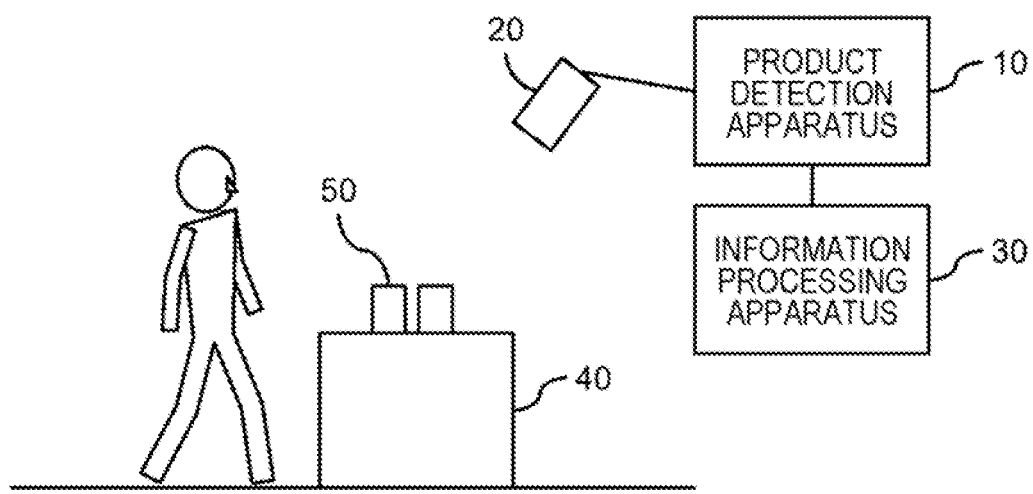
FIG. 1 is a diagram illustrating a usage environment of a product detection apparatus according to a first example embodiment.

FIG. 1 is a diagram illustrating a usage environment of a product detection apparatus 10 according to this present example embodiment. The product detection apparatus 10 is used together with an image capture unit 20 (one example of a first image capture unit). The image capture unit 20 repeatedly images a product placement area, for example, a product shelf 40. Hereinafter, description in case where a product placement area is at least a part of the product shelf 40 is made. A framerate of the image capture unit 20 is optional, but is, for example, 10 frames per second or more.

A product 50 is placed on the product shelf 40. The product detection apparatus 10 detects that, after the product 50 is taken out of the product shelf 40 by a customer, the product 50 has been returned to the product shelf 40 by processing an image generated by the image capture unit 20. A store where the image capture unit 20 and the product shelf 40 are disposed may be a general store such as a convenience store and a supermarket, or may be a corner of a place other than the general store, such as an office (e.g., a so-called micro-store).

Note that, a plurality of image capture units 20 may be provided for one product shelf 40. In this case, each of the plurality of image capture units 20 may image different areas from each other within the product shelf 40. Further, a plurality of image capture units 20 may be provided with respect to one product placement area. In any case, the image capture unit 20 transmits an image generated by the image capture unit 20 to the product detection apparatus 10 in association with image capture unit identification information allocated to the image capture unit 20, and a date and a time when the image is generated.

Note that, a detection result by the product detection apparatus 10 is output to an information processing apparatus 30. A user of the information processing apparatus 30 determines a product to be placed on the product shelf 40, or determines a product 50 and/or a package of the product 50, by statistically processing the detection result by the product detection apparatus 10 by using the information processing apparatus 30.

Figure 2:
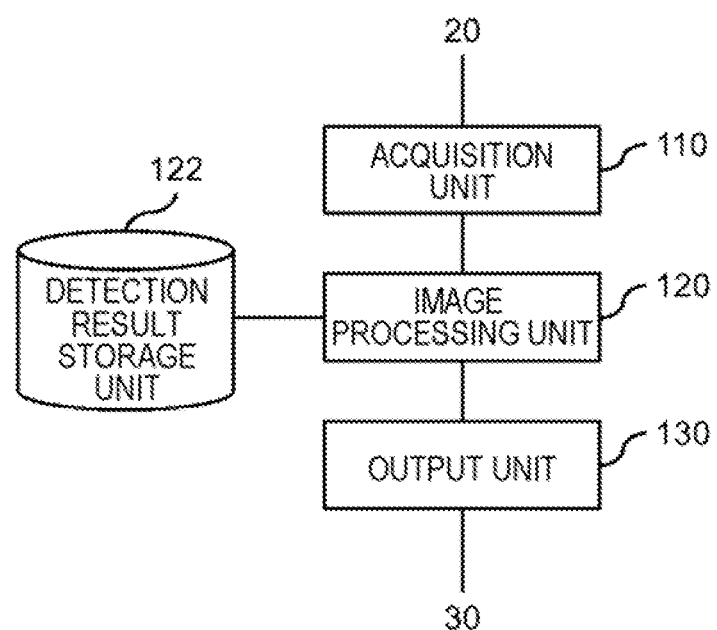
FIG. 2 is a diagram illustrating one example of a functional configuration of the product detection apparatus.

FIG. 2 is a diagram illustrating one example of a functional configuration of the product detection apparatus 10. In the example illustrated in this figure, the product detection apparatus 10 includes an acquisition unit 110, an image processing unit 120, and an output unit 130.

The acquisition unit 110 acquires a plurality of images (one example of a first image) generated by the image capture unit 20 in association with a date and a time when the image is generated. As described above, these plurality of images are generated at different timings from each other.

The image processing unit 120 detects that a state (hereinafter, described as a first state) in which a new product is present on the product shelf 40 continuously for a reference time or longer has been reached, by processing a plurality of images. The reference time used herein is preferably 0.5 second or longer, for example. Note that, the reference time may be counted by the number of frames.

The output unit 130 performs a first output in a case where the first state is detected. The first output indicates that, after the product 50 is taken out of the product shelf 40 by a customer, the product 50 has been returned to the product shelf 40.

Herein, the output unit 130 preferably performs the first output, when the first state is detected at a timing at which a shop clerk does not replenish the product shelf 40 with a product. For example, the image processing unit 120 may store a date and a time when a shop clerk replenishes a product, and use an image photographed at a timing other than the time. Further, in a case where a plurality of products 50 (e.g., two or more products, or three or more products) are continuously placed on the product shelf 40, the image processing unit 120 may determine that a shop clerk replenishes the product shelf 40 with the products 50, and eliminate from a target of the first state. At this occasion, the image processing unit 120 may set, as a condition for eliminating from a target of the first state, a state in which products 50 continuously placed on the product shelf 40 have the same product name as each other.

Further, the image processing unit 120 determines a product name of the product 50 returned to the product shelf 40 by processing an image generated by the image capture unit 20. The determination is performed, for example, by feature value matching.

A processing result of an image by the image processing unit 120 is stored in a detection result storage unit 122. One example of information stored in the detection result storage unit 122 is described below by using FIG. 3.

FIG. 3 illustrates one example of information stored in the detection result storage unit 122. In the example illustrated in this figure, the detection result storage unit 122 stores, for each product, information (e.g., a product code: hereinafter, described as a product name) indicating a product name of the product, a placement position of the product on the product shelf 40, the number of times of detecting the product, and information indicating whether the product is a product being already located (in FIG. 3, described as "located"). Herein, when the number of times of detecting a product satisfies a criterion, "located" becomes "true", and when the number of times of detection does not satisfy the criterion, "located" becomes "false".

Note that, in a case where the product detection apparatus 10 communicates with a plurality of image capture units 20, the detection result storage unit 122 stores, for each of the plurality of image capture units 20, the above-described information in association with image capture unit identification information of the image capture unit 20.

Figure 4:
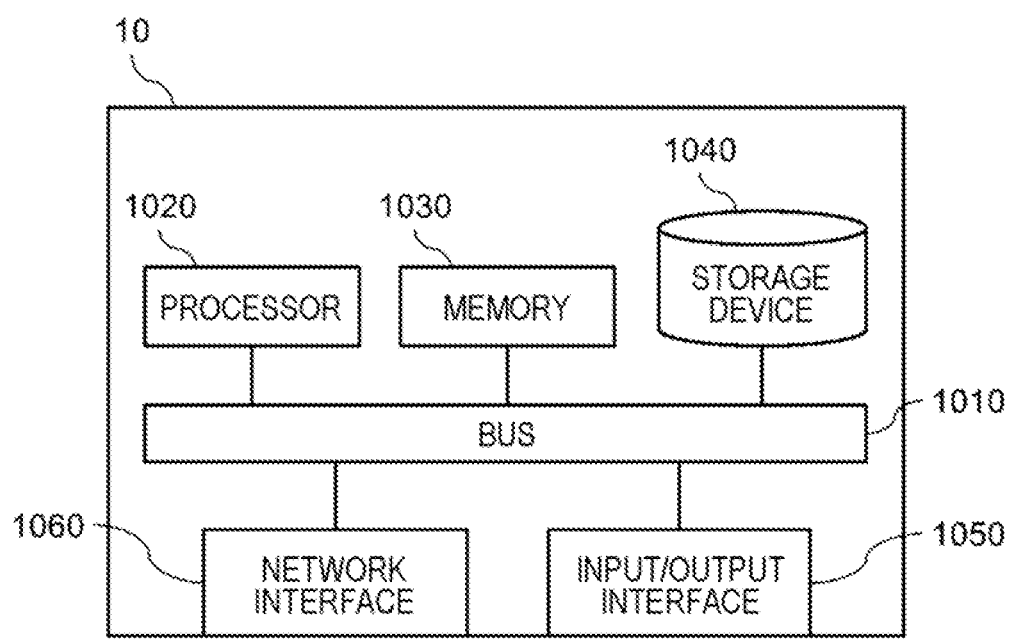
FIG. 4 is a diagram illustrating a hardware configuration example of the product detection apparatus.

FIG. 4 is a diagram illustrating a hardware configuration example of the product detection apparatus 10. The product detection apparatus 10 includes a bus 1010, a processor 1020, a memory 1030, a storage device 1040, an input/output interface 1050, and a network interface 1060.

The bus 1010 is a data transmission path along which the processor 1020, the memory 1030, the storage device 1040, the input/output interface 1050, and the network interface 1060 mutually transmit and receive data. However, a method of mutually connecting the processor 1020 and the like is not limited to bus connection.

The processor 1020 is a processor to be achieved by a central processing unit (CPU), a graphics processing unit (GPU), or the like.

The memory 1030 is a main storage apparatus to be achieved by a random access memory (RAM) or the like.

The storage device 1040 is an auxiliary storage apparatus to be achieved by a hard disk drive (HDD), a solid state drive (SSD), a memory card, a read only memory (ROM), or the like. The storage device 1040 stores a program module for achieving each function (e.g., the acquisition unit 110, the image processing unit 120, and the output unit 130) of the product detection apparatus 10. Each function associated with each program module is achieved by causing the processor 1020 to read the program module in the memory 1030 and execute the program module. Further, the storage device 1040 also functions as the detection result storage unit 122.

The input/output interface 1050 is an interface for connecting the product detection apparatus 10 to various input/output devices.

The network interface 1060 is an interface for connecting the product detection apparatus 10 to a network. The network is, for example, a local area network (LAN) or a wide area network (WAN). A method of connecting the network interface 1060 to a network may be wireless connection or may be wired connection. The product detection apparatus 10 communicates with the image capture unit 20 and the information processing apparatus 30, for example, via the network interface 1060.

Figure 5:
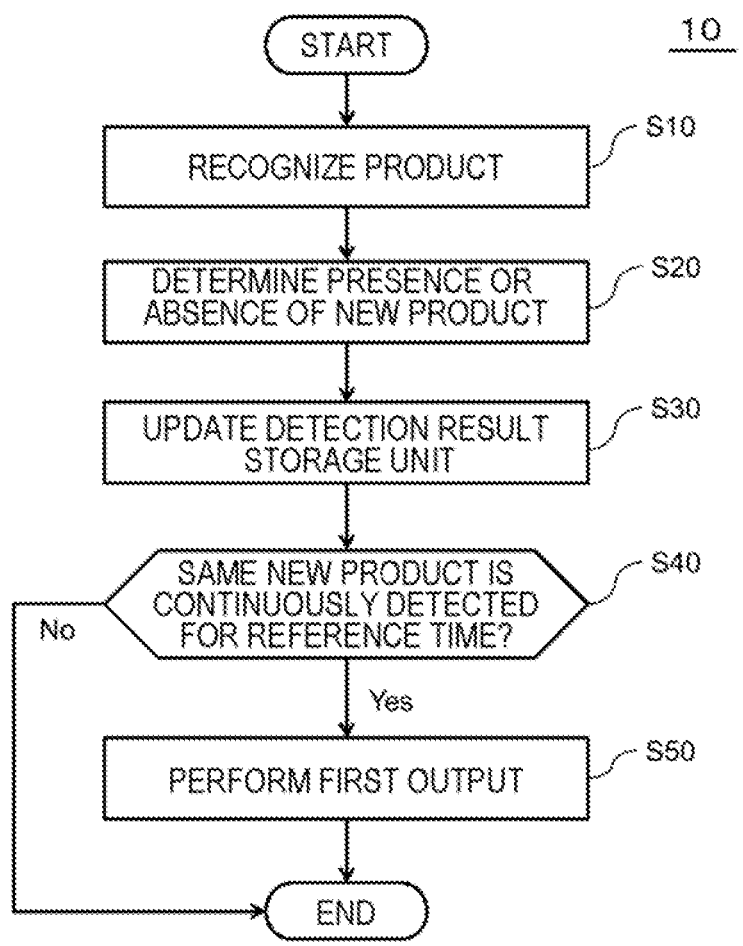
FIG. 5 is a diagram illustrating a first example of processing to be performed by the product detection apparatus.

FIG. 5 is a diagram illustrating a first example of processing to be performed by the product detection apparatus 10. The product detection apparatus 10 performs processing illustrated in this figure for each of a plurality of images generated by the image capture unit 20. Note that, the processing may be performed each time the acquisition unit 110 acquires an image, or may be performed by batch processing.

First, the image processing unit 120 of the product detection apparatus 10 processes an image to be processed, and recognizes, for each product 50 placed on the product shelf 40, a product name (one example of product determination information) of the product and a position thereof (step S10). Then, the image processing unit 120 determines whether a new product 50 is placed on the product shelf 40 by using a processing result in step S10, and information stored in the detection result storage unit 122 (step S20).

For example, when there is a combination of a product name and a position of the product 50, which is not stored in the detection result storage unit 122, among combinations generated in step S10, the image processing unit 120 determines that the product 50 associated with the combination is a product newly placed on the product shelf 40. Then, the image processing unit 120 causes the detection result storage unit 122 to store the combination (step S30). At this occasion, regarding the combination, the number of times of detecting the product becomes "1", and "located" becomes "false" (step S30).

Further, when a combination of a product name and a position of the product 50 is stored in the detection result storage unit 122 among combinations generated in step S10, the image processing unit 120 increases the number of times of detecting the product by 1 in the detection result storage unit 122. Herein, regarding a product in which "located" is "true", the image processing unit 120 does not need to increase the number of times of detection. Then, the image processing unit 120 determines that the product 50 in which the number of times of detection after change becomes equal to or more than a reference has been placed on the product shelf 40 before the change, and changes "located" of the product from "false" to "true" in the detection result storage unit 122 (step S30).

Note that, in the above-described processing, for example, an area associated with the product within an image is determined to be a rectangle. Then, determination as to whether "the product is at the same position" is determined based on an overlapping rate of the rectangle. For example, in a case where the overlapping rate is equal to or more than a reference value, the product is determined to be at the same position.

Then, when a product 50 in which the column "located" is changed from "false" to "true" is present, the image processing unit 120 determines that the product 50 is continuously detected for a reference time (step S40: Yes). Further, it is determined that the product 50 is in the above-described first state, specifically, a state in which the product 50 has been returned to the product shelf 40 by a customer. Then, the output unit 130 outputs the first output to the information processing apparatus 30 (step S50). Herein, the output unit 130 includes, in the first output, information for determining the product 50 in which an elapsed time becomes equal to or longer than the reference time, for example, information indicating a product name of the product 50.

Note that, the image processing unit 120 may delete, from among information related to products 50 stored in the detection result storage unit 122, information other than a product 50 in which "located" is "true", a newly registered product 50, and a product 50 in which the number of times of detection is increased by 1. Thus, information as noise is deleted from the detection result storage unit 122.

Further, in a case where the product shelf 40 is partitioned into a plurality of product placement areas, and the image capture unit 20 is provided for each of the product placement areas, the product detection apparatus 10 performs processing illustrated in FIG. 5 for each image capture unit 20, specifically, for each product placement area. In this case, in step S50, it is preferable that the output unit 130 includes, in the first output, information for determining a product placement area in which the first state is detected.

Figure 6:
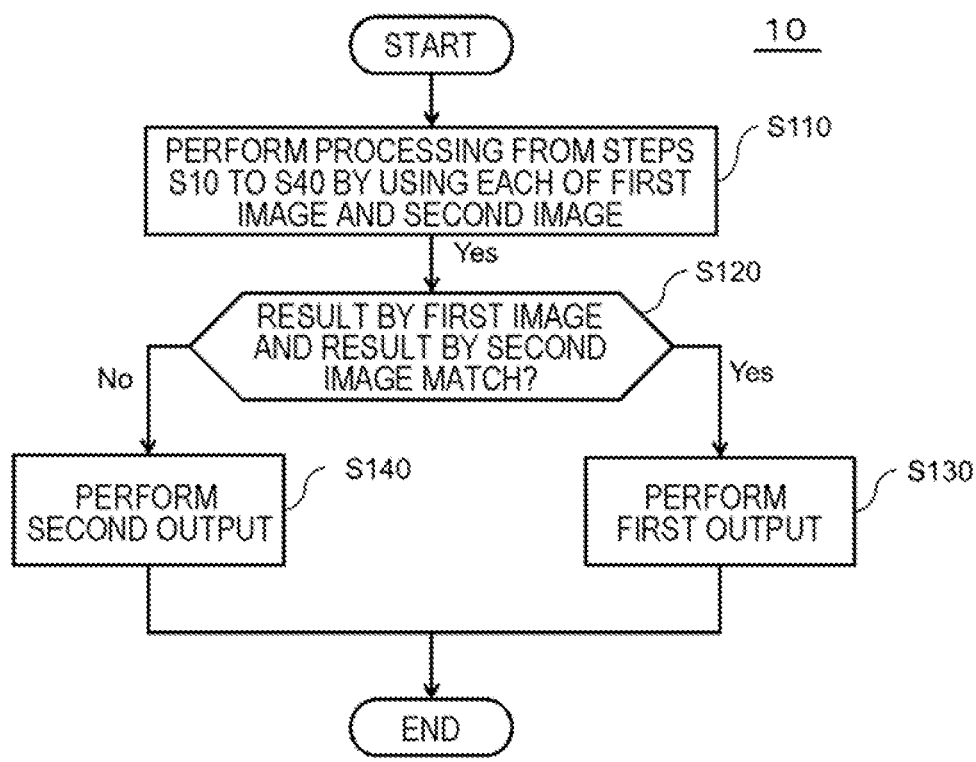
FIG. 6 is a diagram illustrating a second example of processing to be performed by the product detection apparatus.

FIG. 6 is a diagram illustrating a second example of processing to be performed by the product detection apparatus 10. In the example illustrated in this figure, two image capture units 20 are installed with respect to one product placement area. Each of these two image capture units 20 repeatedly images the product placement area. Further, also in the example illustrated in this figure, the product detection apparatus 10 performs processing illustrated in this figure for each product placement area. Note that, the processing may be performed each time the acquisition unit 110 acquires an image, or may be performed by batch processing.

First, the acquisition unit 110 acquires an image (hereinafter, described as a first image) generated by one of the image capture units 20, and an image (hereinafter, described as a second image) generated by the other image capture unit 20, performs processing illustrated in steps S10 to S40 in FIG. 5 by using the first image, and performs processing illustrated in steps S10 to S40 in FIG. 5 by using the second image (step S110). Herein, a generation timing of the first image is the same as a generation timing of the second image. Herein, it is assumed that, even when there is a slight difference between two generation timings, for example, a difference being equal to or less than a time equivalent to 1 framerate, these two generation timings are the same. In other words, the image processing unit 120 determines whether the above-described first state has been reached by using the second image, as well as determining whether the above-described first state has been reached by using the first image.

Then, in a case where a processing result using the first image, and a processing result using the second image match (step S120: Yes), the output unit 130 performs the first output, similarly to step S50 in FIG. 5 (step S130). On the other hand, in a case where a processing result using the first image, and a processing result using the second image do not match (step S120: No), since a possibility that some anomaly has occurred is high, the output unit 130 performs an output (hereinafter, described as a second output) different from the first output (step S140).

Herein, as a first example in which processing results do not match, a case is described in which a processing result using the first image indicates the first state, but a processing result using the second image does not indicate the first state. Further, as a second example in which processing results do not match, a case is described in which a product name of the product 50 recognized by using the first image is different from a product name of the product 50 recognized by using the second image.

Note that, the second output includes, for example, information indicating that some anomaly has occurred. Further, the second output may include the first image and the second image. Thus, a user of the information processing apparatus 30 can determine a content of an anomaly by visually recognizing the first image and the second image.

Thereafter, the image processing unit 120 updates the detection result storage unit 122 (step S170). Details of processing to be performed herein are similar to step S50 in FIG. 5.

As described above, according to the present example embodiment, it is determined whether the product 50 has been returned to the product shelf 40 by a customer by using an elapsed time from a time when the product 50 is placed on the product shelf 40. Therefore, it is possible to detect that a customer has returned the product to a product placement area without detecting the customer.

Second Example Embodiment

Figure 7:
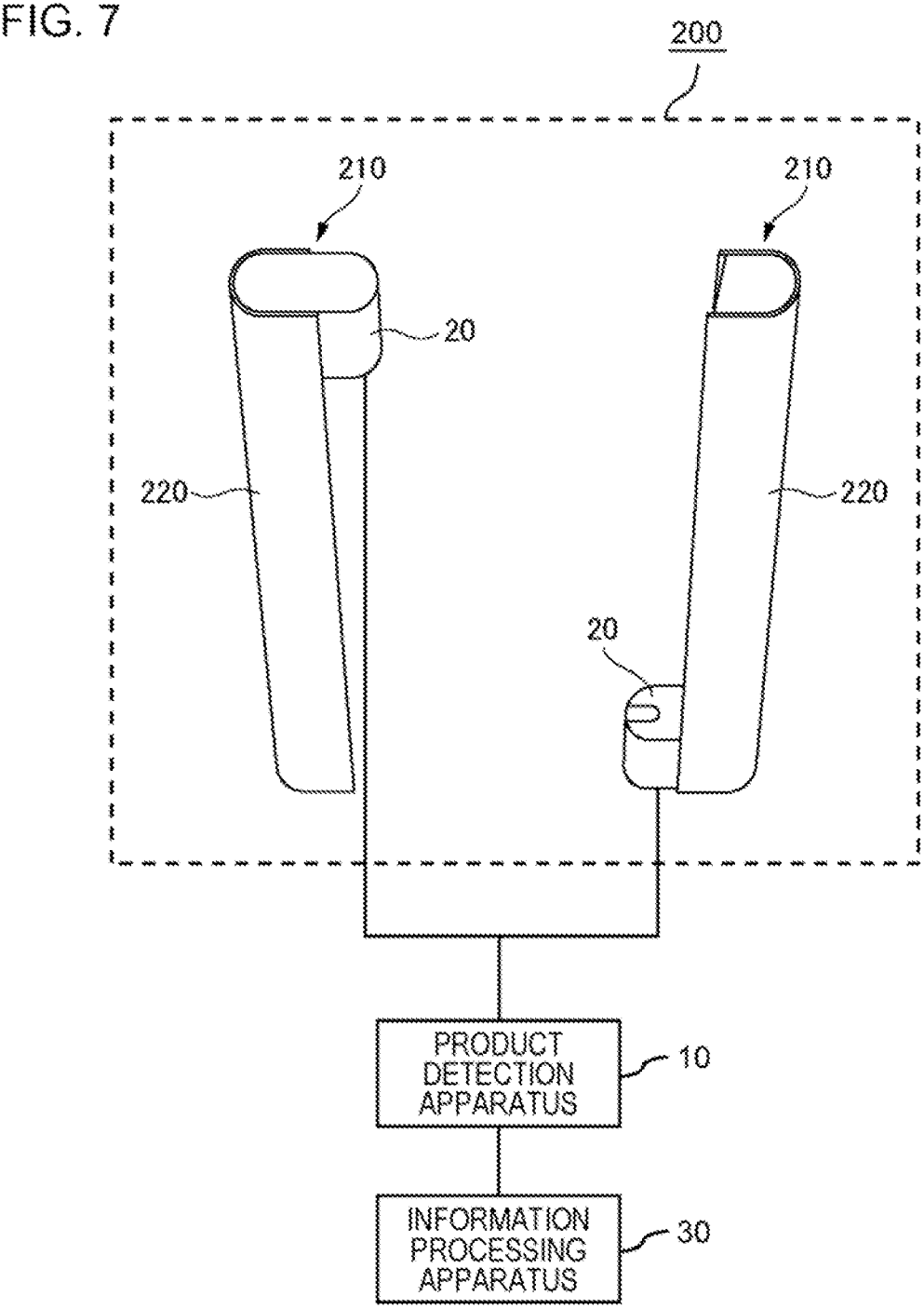
FIG. 7 is a diagram illustrating an image capture unit according to a second example embodiment.
Figure 8:
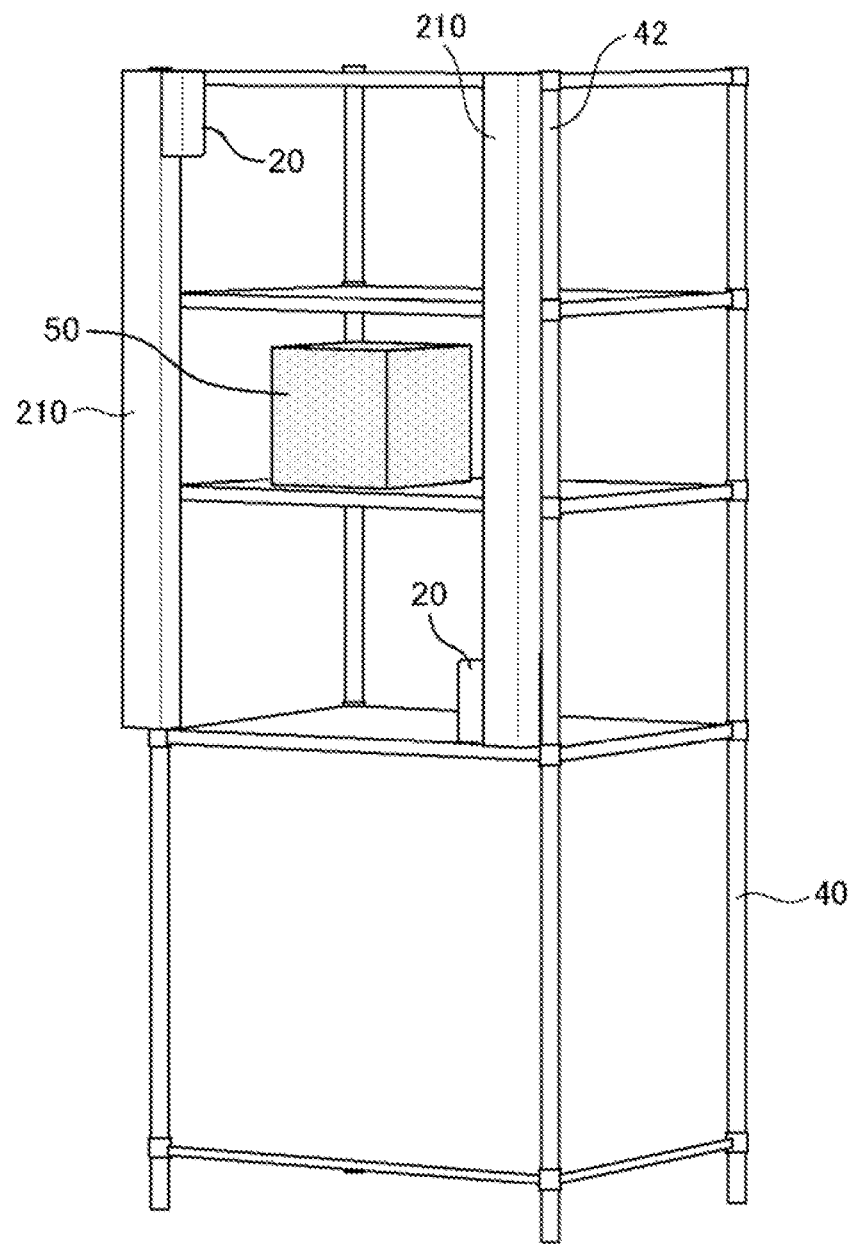
FIG. 8 is a diagram illustrating a use method of the image capture unit.

FIG. 7 is a diagram illustrating an image capture unit 20 according to a second example embodiment. FIG. 8 is a diagram illustrating a use method of the image capture unit 20. In this present example embodiment, the image capture unit 20 to be used together with a product detection apparatus 10 becomes a part of an imaging apparatus 200.

More specifically, the imaging apparatus 200 includes two image capturing units 210. Each of the two image capturing units 210 includes a lighting unit 220 and the image capture unit 20.

A light irradiation surface of the lighting unit 220 extends in one direction, and includes a light emitting unit and a cover for covering the light emitting unit. The lighting unit 220 mainly irradiates light in a direction orthogonal to the extending direction of the light irradiation surface. The light emitting unit includes a light emitting element such as an LED, and irradiates light in a direction in which the light emitting unit is not covered by the cover. Note that, in a case where the light emitting element is an LED, a plurality of the LEDs are aligned in a direction (up-down direction in the figure) in which the lighting unit 220 extends.

Further, the image capture unit 20 is provided at one end of the lighting unit 220, and a direction in which light of the lighting unit 220 is irradiated is set as an image capture area. For example, in the left side image capturing unit 210 in FIG. 7, the image capture unit 20 has, as an image capture area, a lower area and a diagonally lower right area. Further, in the right side image capturing unit 210 in FIG. 7, the image capture unit 20 has, as an image capture area, an upper area and a diagonally upper left area.

As illustrated in FIG. 8, the two image capturing units 210 are mounted on a front surface frame 42 (or front surfaces on side walls of both sides) of a product shelf 40. At this occasion, a first image capturing unit 210 is mounted on one of the front surface frames 42 in a direction in which the image capture unit 20 is located at a lower position, and a second image capturing unit 210 is mounted on the front surface frame 42 on an opposite side of the first image capturing unit 210 in a direction in which the image capture unit 20 is located at an upper position. Further, the image capture unit 20 of the first image capturing unit 210 images an upper area and a diagonally upper area in such a way that an opening portion of the product shelf 40 is included in the image capture area. On the other hand, the image capture unit 20 of the second image capturing unit 210 images a lower area and a diagonally lower area in such a way that the opening portion of the product shelf 40 is included in the image capture area. By using the two image capturing units 210 as described above, it is possible to photograph the entire area of the opening portion of the product shelf 40.

Further, the product detection apparatus 10 generates various pieces of information described in the above-described example embodiment by processing an image imaged by the image capture unit 20 of each of the two image capturing units 210, specifically, an image imaged by the two image capture units 20.

An advantageous effect similar to that of the first example embodiment is also acquired by the present example embodiment.

As described above, example embodiments according to the present invention have been described with reference to the drawings, however, these example embodiments are an example of the present invention, and various configurations other than the above can also be adopted.

Further, in a plurality of flowcharts used in the above description, a plurality of processes (pieces of processing) are described in order, however, an order of execution of processes to be performed in each example embodiment is not limited to the order of description. In each example embodiment, the order of illustrated processes can be changed within a range that does not adversely affect a content. Further, the above-described example embodiments can be combined, as far as contents do not conflict with each other.

A part or all of the above-described example embodiments may also be described as the following supplementary notes, but is not limited to the following.

1. A product detection apparatus, including:
   an acquisition unit for acquiring a plurality of first images generated at different timings from each other by a first imaging unit for photographing a product placement area;
   an image processing unit for detecting a first state being a state in which a new product is present in the product placement area continuously for a reference time or longer by processing the plurality of first images; and
   an output unit for performing a first output in a case where the first state is detected.

2. The product detection apparatus according to supplementary note 1, wherein
   the output unit performs the first output, when the first state is detected at a timing at which a shop clerk does not replenish the product placement area with a product.

3. The product detection apparatus according to supplementary note 1 or 2, wherein
   the first imaging unit is provided for each of a plurality of the product placement areas,
   the image processing unit detects, for the each product placement area, the first state by processing the plurality of first images generated by the first imaging unit being associated with the product placement area, and
   the output unit includes, in the first output, information for determining the product placement area in which the first state is detected.

4. The product detection apparatus according to any one of supplementary notes 1 to 3, wherein
   the image processing unit generates product determination information for determining a product name of the new product, and the output unit includes, in the first output, the product determination information.

5. The product detection apparatus according to supplementary note 4, wherein
the acquisition unit acquires a plurality of second images generated at different timings from each other by a second imaging unit for photographing the product placement area being a same for the first imaging unit,
the image processing unit generates the product determination information of the new product by further processing the second image, and
the output unit performs a second output being different from the first output, when the product determination information generated by using the first image is different from the product determination information generated by using the second image.

6. The product detection apparatus according to any one of supplementary notes 1 to 4, wherein
the acquisition unit acquires a plurality of second images generated at different timings from each other by a second imaging unit for photographing the product placement area being a same for the first imaging unit,
the image processing unit detects the first state by further processing the plurality of second images, and
the output unit
performs the first output, when a first result being a processing result of the plurality of first images indicates the first state, and a second result being a processing result of the plurality of second images generated at a same time as the plurality of first images used at a time of detecting the first state indicates the first state, and
performs a second output being different from the first output, when the first result indicates the first state, and the second result does not indicate the first state.

7. A product detection method including:
by a computer,
acquiring a plurality of first images generated at different timings from each other by a first imaging unit for photographing a product placement area;
detecting a first state being a state in which a new product is present in the product placement area continuously for a reference time or longer by processing the plurality of first images; and
performing a first output in a case where the first state is detected.

8. The product detection method according to supplementary note 7, further including,
by the computer,
performing the first output, when the first state is detected at a timing at which a shop clerk does not replenish the product placement area with a product.

9. The product detection method according to supplementary note 7 or 8, wherein
the first imaging unit is provided for each of a plurality of the product placement areas,
the product detection method further including:
by the computer,
detecting, for the each product placement area, the first state by processing the plurality of first images generated by the first imaging unit being associated with the product placement area; and
including, in the first output, information for determining the product placement area in which the first state is detected.

10. The product detection method according to any one of supplementary notes 7 to 9, further including:
by the computer,
generating product determination information for determining a product name of the new product; and
including, in the first output, the product determination information.

11. The product detection method according to supplementary note 10, further including:
by the computer,
acquiring a plurality of second images generated at different timings from each other by a second imaging unit for photographing the product placement area being a same for the first imaging unit;
generating the product determination information of the new product by further processing the second image; and
performing a second output being different from the first output, when the product determination information generated by using the first image is different from the product determination information generated by using the second image.

12. The product detection method according to any one of supplementary notes 7 to 10, further including:
by the computer,
acquiring a plurality of second images generated at different timings from each other by a second imaging unit for photographing the product placement area being a same for the first imaging unit;
detecting the first state by further processing the plurality of second images;
performing the first output, when a first result being a processing result of the plurality of first images indicates the first state, and a second result being a processing result of the plurality of second images generated at a same time as the plurality of first images used at a time of detecting the first state indicates the first state; and
performing a second output being different from the first output, when the first result indicates the first state, and the second result does not indicate the first state.

13. A program causing a computer to execute:
an acquisition function of acquiring a plurality of first images generated at different timings from each other by a first imaging unit for photographing a product placement area;
a detection function of detecting a first state being a state in which a new product is present in the product placement area continuously for a reference time or longer by processing the plurality of first images; and
an output function of performing a first output in a case where the first state is detected.

14. The program according to supplementary note 13, wherein
the output function performs the first output, when the first state is detected at a timing at which a shop clerk does not replenish the product placement area with a product.

15. The program according to supplementary note 13 or 14, wherein
the first imaging unit is provided for each of a plurality of the product placement areas,
the image processing function detects, for the each product placement area, the first state by processing the plurality of first images generated by the first imaging unit being associated with the product placement area, and the output function includes, in the first output, information for determining the product placement area in which the first state is detected.

16. The program according to any one of supplementary notes 13 to 15, wherein
the image processing function generates product determination information for determining a product name of the new product, and
the output function includes, in the first output, the product determination information.

17. The program according to supplementary note 16, wherein
the acquisition function acquires a plurality of second images generated at different timings from each other by a second imaging unit for photographing the product placement area being a same for the first imaging unit,
the image processing function generates the product determination information of the new product by further processing the second image, and
the output function performs a second output being different from the first output, when the product determination information generated by using the first image is different from the product determination information generated by using the second image.

18. The program according to any one of supplementary notes 13 to 16, wherein
the acquisition function acquires a plurality of second images generated at different timings from each other by a second imaging unit for photographing the product placement area being a same for the first imaging unit,
the image processing function detects the first state by further processing the plurality of second images, and
the output function
performs the first output, when a first result being a processing result of the plurality of first images indicates the first state, and a second result being a processing result of the plurality of second images generated at a same time as the plurality of first images used at a time of detecting the first state indicates the first state, and
performs a second output being different from the first output, when the first result indicates the first state, and the second result does not indicate the first state.

REFERENCE SIGNS LIST

10 Product detection apparatus
20 Image capture unit
30 Information processing apparatus
40 Product shelf
42 Front surface frame
50 Product
110 Acquisition unit
120 Image processing unit
122 Detection result storage unit
130 Output unit
200 Imaging apparatus
210 Image capturing unit
210 First image capturing unit
210 Second image capturing unit
220 Lighting unit

What is claimed is:

1. A system comprising:
a first image capturing unit for photographing a product placement area, the first image capturing unit disposed on one side of the product placement area and including a first lighting unit and a first image capture unit, the first lighting unit irradiating light on an image capture area of the first image capturing unit, the first image capture unit provided at a lower end of the first lighting unit and imaging an upper area and a diagonally upper area from the first image capture unit;
a second image capturing unit for photographing the product placement area, the second image capturing unit disposed on an opposite side of the first image capturing unit and including a second lighting unit and a second image capture unit, the second lighting unit irradiating light on an image capture area of the second image capturing unit, the second image capture unit provided at an upper end of the second lighting unit and imaging a lower area and a diagonally lower area from the second image capture unit, wherein the first image capture unit is vertically lower than the second image capture unit in relation to the product placement area;
at least one memory storing instructions;
and at least one processor configured to execute the instructions to perform operations comprising:
acquiring a plurality of first images generated at different timings from each other by the first image capturing unit;
detecting a first state that is a state in which a new product is present in the product placement area continuously for a reference time or longer by processing the plurality of first images;
acquiring a plurality of second images generated at different timings from each other by the second image capturing unit;
detecting the first state by processing the plurality of second images;
when the first state is detected by processing the plurality of first images, generating first product determination information for determining a product name of the new product by processing a first image of the plurality of first images;
when the first state is detected by processing the plurality of second images, generating second product determination information for determining the product name of the new product by processing a second image of the plurality of second images;
performing a first output in a case in which the first product determination information based on the plurality of first images captured at a timing at which a shop clerk does not replenish the product placement area with a product and the second product determination information based on the plurality of second image captured at the timing at which the shop clerk does not replenish the product placement area with the product match;
not performing the first output based on the plurality of first images captured and the plurality of second images captured at the timing at which the shop clerk is replenishing the product placement area with the product;
and performing a second output different from the first output, in a case in which the first product determination information is different from the second product determination information.

2. The system according to claim 1,
wherein the first image capturing unit is provided for each of the plurality of the product placement areas,
detecting the first state comprises detecting, for each product placement area, the first state by processing the plurality of first images generated by the first image capturing unit associated with the product placement area, and performing the first output comprises including, in the first output, information for determining the product placement area in which the first state is detected.

3. The system according to claim 1, wherein the operations further comprise generating product determination information for determining the product name of the new product, and performing the first output comprises including, in the first output, the product determination information.

4. The system according to claim 1,
wherein performing the first output comprises performing the first output, when a first result being a processing result of the plurality of first images indicates the first state, and a second result being a processing result of the plurality of second images generated at a same time as the plurality of first images used at a time of detecting the first state indicates the first state,
and performing the second output comprises performing the second output, when the first result indicates the first state and the second result does not indicate the first state.

5. The system according to claim 1, wherein detecting the first state by processing the plurality of first images for detecting the first state comprises detecting the first state processing only the plurality of first images photographed at a timing other than a prestored data and a prestored time at which the shop clerk replenishes the product.

6. The system according to claim 1, wherein the first state is not detected in a case where a plurality of products are continuously places on the product placement area.

7. The system according to claim 1, wherein the first output indicates that, after a product is taken out of the product placement area by a customer, the product has been returned to the product placement area.

8. A product detection method performed by a computer of a system, the system comprising:
a first image capturing unit for photographing a product placement area, the first image capturing unit disposed on one side of the product placement area and including a first lighting unit and a first image capture unit, the first lighting unit irradiating light on an image capture area of the first image capturing unit, the first image capture unit provided at a lower end of the first lighting unit and imaging an upper area and a diagonally upper area from the first image capture unit;
and a second image capturing unit for photographing the product placement area, the second image capturing unit disposed on an opposite side of the first image capturing unit and including a second lighting unit and a second image capture unit, the second lighting unit irradiating light on an image capture area of the second image capturing unit, the second image capture unit provided at an upper end of the second lighting unit and imaging a lower area and a diagonally lower area from the second image capture unit, wherein the first image capture unit is vertically lower than the second image capture unit in relation to the product placement area,
wherein the product detection method comprises, by the computer:
acquiring a plurality of first images generated at different timings from each other by the first image capturing unit;
detecting a first state that is a state in which a new product is present in the product placement area continuously for a reference time or longer by processing the plurality of first images;
acquiring a plurality of second images generated at different timings from each other by the second image capturing unit;
detecting the first state by processing the plurality of second images;
when the first state is detected by processing the plurality of first images, generating first product determination information for determining a product name of the new product by processing a first image of the plurality of first images;
when the first state is detected by processing the plurality of second images, generating second product determination information for determining the product name of the new product by processing a second image of the plurality of second images;
performing a first output in a case in which the first product determination information based on the plurality of first images captured at a timing at which a shop clerk does not replenish the product placement area with a product and the second product determination information based on the plurality of second images captured at the timing at which the shop clerk does not replenish the product placement area with the product match;
not performing the first output based on the plurality of first images captured and the plurality of second images captured at the timing at which the shop clerk is replenishing the product placement area with the product;
and performing a second output different form the first output, in a case in which the first product determination information is different from the second product determination information.

9. The product detection method according to claim 8, wherein the first image capturing unit is provided for each of a plurality of the product placement areas,
detecting the first state comprises detecting, for each product placement area, the first state by processing the plurality of first images generated by the first image capturing unit associated with the product placement area,
and performing the first output comprises including, in the first output, information for determining the product placement area in which the first state is detected.

10. The product detection method according to claim 8, further comprising generating product determination information for determining the product name of the new product, wherein performing the first output comprises including, in the first output, the product determination information.

11. The product detection method according to claim 8, wherein
performing the first output comprises performing the first output, when a first result being a processing result of the plurality of first images indicates the first state, and a second result being a processing result of the plurality of second images generated at a same time as the plurality of first images used at a time of detecting the first state indicates the first state, and
performing the second output comprises performing the second output when the first result indicates the first state and the second result does not indicate the first state.

12. A non-transitory storage medium storing a program executable by a computer of a system to execute a product detection method, the system comprising:
- a first image capturing unit for photographing a product placement area, the first image capturing unit disposed on one side of the product placement area and including a first lighting unit and a first image capture unit, the first lighting unit irradiating light on an image capture area of the first image capturing unit, the first image capture unit provided at a lower end of the first lighting unit and imaging an upper area and a diagonally upper area form the first image capture unit;
- and a second image capturing unit for photographing the product placement area, the second image capturing unit disposed on an opposite side of the first image capturing unit and including a second lighting unit and a second image capture unit, the second lighting unit irradiating light on an image capture area of the second image capturing unit, the second image capture unit provided at an upper end of the second lighting unit and imaging a lower area and a diagonally lower area form the second image capture unit, wherein the first image capture unit is vertically lower than the second image capture unit in relation to the product placement area, wherein the product detection method comprises:
- acquiring a plurality of first images generated at different timings from each other by the first image capturing unit;
- detecting a first state that is a state in which a new product is present in the product placement area continuously for a reference time or longer by processing the plurality of first images;
- acquiring a plurality of second images generated at different timings from each other by the second image capturing unit;
- detecting the first state by processing the plurality of second images;
- when the first state is detected by processing the plurality of first images, generating first product determination information for determining a product name of the new product by processing a first image of the plurality of first images;
- when the first state is detected by processing the plurality of second images, generating second product determination information for determining the product name of the new product by processing a second image of the plurality of second images;
- performing a first output in case in which the first product determination information based on the plurality of first images captured at a timing at which a shop clerk does not replenish the product placement area with a product and the second product determination information based on the plurality of second images captured at the timing at which the shop clerk does not replenish the product placement area with the product match;
- not performing the first output based on the plurality of first images captured and the plurality of second images captured at the timing at which the shop clerk is replenishing the product placement area with the product;
- and performing a second output different from the first output, in a case in which the first product determination information is different from the second product determination information.

13. The non-transitory storage medium according to claim 12, wherein the first image capturing unit is provided for each of a plurality of the product placement areas,
- detecting the first state comprises detecting, for each product placement area, the first state by processing the plurality of first images generated by the first image capturing unit associated with the product placement area,
- and performing the first output comprises including, in the first output, information for determining the product placement area in which the first state is detected.

14. The non-transitory storage medium according to claim 12, wherein the product detection method further comprises generating product determination information for determining the product name of the new product,
- and performing the first output comprises including, in the first output, the product determination information.

15. The non-transitory storage medium according to claim 12, wherein
- performing the first output comprises performing the first output, when a first result being a processing result of the plurality of first images indicates the first state, and a second result being a processing result of the plurality of second images generated at a same time as the plurality of first images used at a time of detecting the first state indicates the first state,
- and performing the second output comprises performing the second output, when the first result indicates the first state and the second result does not indicate the first state.

* * * * *